US012690722B2

(12) United States Patent　　(10) Patent No.:　US 12,690,722 B2

Lund　　(45) Date of Patent:　　Jul. 28, 2026

(54) DEVICES AND METHODS FOR A RACK FOR COOKING AND SUPPORTING MEAT

(71) Applicant: Brent Alexander Lund, Fairview (CA)

(72) Inventor: Brent Alexander Lund, Fairview (CA)

( * ) Notice: Subject to any disclaimer, the term of this patent is extended or adjusted under 35 U.S.C. 154(b) by 645 days.

(21) Appl. No.: 18/069,516

(22) Filed: Dec. 21, 2022

(65) Prior Publication Data

US 2024/0206683 A1　　Jun. 27, 2024

(51) Int. Cl.
　　*A47J 43/18*　　(2006.01)
　　*A23L 5/10*　　(2016.01)
　　*A47F 7/00*　　(2006.01)
　　*A47F 5/01*　　(2006.01)

(52) U.S. Cl.
　　CPC ................. *A47J 43/18* (2013.01); *A23L 5/10* (2016.08); *A47F 7/0071* (2013.01); *A47F 5/01* (2013.01); *A47G 2400/06* (2013.01)

(58) Field of Classification Search
　　CPC . A47J 43/18; A23L 5/10; A47G 19/30; A47G 2400/06; A47G 2400/064; A47F 7/0071; A47F 5/01; A47F 7/00; A47B 75/00; A47B 57/04; A47B 81/00
　　See application file for complete search history.

(56) References Cited

U.S. PATENT DOCUMENTS 2,128,952 A * 9/1938 Mareta ............... A22C 17/0053
　　　　　　　　　　　　　　　　　426/281
2,850,762 A * 9/1958 Goldberg ........... A22C 21/0069
　　　　　　　　　　　　　　　　　452/188

D260,221 S * 8/1981 Lee ................................ D7/359
4,407,189 A * 10/1983 Bentson .............. A47J 37/0694
　　　　　　　　　　　　　　　　　211/198
D333,235 S * 2/1993 Bertelsen ....................... D7/403
5,638,742 A * 6/1997 Kassaseya .............. A47J 43/18
　　　　　　　　　　　　　　　　　99/449
D397,584 S * 9/1998 Vannello ........................ D7/704
D416,169 S 11/1999 Sarnoff
6,386,096 B1 * 5/2002 Tiemann ................. A47J 43/18
　　　　　　　　　　　　　　　　　99/449
7,350,458 B2 * 4/2008 Leibowitz ............... A47J 43/18
　　　　　　　　　　　　　　　　　99/449
8,418,604 B1 * 4/2013 Zemel ................. A47J 37/0694
　　　　　　　　　　　　　　　　　99/449

(Continued)

FOREIGN PATENT DOCUMENTS

GB　　　　2330520　　　4/1999

OTHER PUBLICATIONS

International Searching Authority, International Search Report and Written Opinion of corresponding PCT publication WO2024130419, Mar. 28, 2024, 8 pages.

*Primary Examiner* — Devin K Barnett

(74) *Attorney, Agent, or Firm* — Robert A. Nissen

(57)　　　　ABSTRACT

Described herein are devices and methods for cooking and supporting meat and poultry with a meat and poultry support rack. The meat and poultry support rack comprises a meat and poultry support element, a first stand element, and a second stand element. The meat and poultry support rack preferably holds meat or poultry above a cooking pan, on an angle, enabling even, fast cooking, and retaining juices in the meat and poultry. The meat and poultry support rack comes apart into three pieces for easy storage and cleaning.

18 Claims, 5 Drawing Sheets

(56) References Cited

U.S. PATENT DOCUMENTS

| | | | | | |
|---|---|---|---|---|---|
| 8,621,988 | B1 * | 1/2014 | O'Dea | .................... | A47J 43/18 |
| | | | | | 99/347 |
| 9,155,423 | B2 * | 10/2015 | Malone | ................... | A47J 43/18 |
| 9,782,037 | B2 * | 10/2017 | Foss | ...................... | A47J 37/049 |
| D838,548 | S * | 1/2019 | Meller | ........................... | D7/409 |
| 10,412,981 | B2 * | 9/2019 | Popeil | ................. | A47J 37/1204 |
| D885,128 | S * | 5/2020 | Rickstrew | ...................... | D7/409 |
| D900,546 | S * | 11/2020 | Rickstrew | ...................... | D7/409 |
| 2006/0266227 | A1 * | 11/2006 | Britt | ........................ | A47J 43/18 |
| | | | | | 99/426 |
| 2011/0070345 | A1 * | 3/2011 | Groll | ...................... | A23L 13/70 |
| | | | | | 99/345 |
| 2016/0206141 | A1 * | 7/2016 | Aquilante | ........... | A47J 37/0694 |
| 2018/0249864 | A1 * | 9/2018 | Meller | ................... | A47J 43/18 |
| 2019/0133376 | A1 * | 5/2019 | Massé | ................ | A47J 37/1295 |
| 2019/0142218 | A1 * | 5/2019 | Popeil | ................ | A47J 37/0694 |
| | | | | | 426/302 |
| 2022/0296046 | A1 * | 9/2022 | O'Dea | .................... | A47J 43/18 |

* cited by examiner

DEVICES AND METHODS FOR A RACK FOR COOKING AND SUPPORTING MEAT

FIELD OF THE INVENTION

The present invention relates generally to the field of cooking racks, and more specifically to devices and methods for a rack for cooking and supporting meat and poultry.

BACKGROUND

Any discussion of the related art throughout the specification should in no way be considered as an admission that such related art is widely known or forms part of common general knowledge in the field.

U.S. Pat. No. 5,638,742 discloses a rack for supporting poultry in a baking pan during a cooking operation, including two slidably interconnected sections that can be pulled apart for disengagement from the turkey or chicken after the rack has been transferred from the baking pan to a serving tray or platter. Each section of the rack has a lifter handle to facilitate the process of lifting and moving the rack. A shortcoming with this device is the significant difficulty in cleaning this poultry rack, due to the overlap in sections, specifically those attached by a slidable interconnection. Further, the device holds the poultry level with the base of the baking sheet, which does not allow for juices to be retained by the poultry. The poultry is cooked lying down, meaning that the heat of the oven cannot be distributed evenly around the poultry.

U.S. Pat. No. 6,386,096B1 discloses a roasting rack for various fowls including a base with pivotal and adjustable support members thereon, which members form a supporting V-frame with each member arranged to receive a portion of the anatomy, such as the wings, of the fowl such that the fowl is positionable, breast down, onto the V-frame. The members forming the frame are positionable for adjustment in accordance with the size of the fowl being roasted. This device may also be extremely difficult to clean due to the many interconnected parts described. It also cooks the poultry on a level surface, which does not allow for juices to be retained by the poultry. The poultry is cooked lying down, meaning that the heat of the oven cannot be distributed evenly around the poultry.

U.S. Pat. No. 7,350,458B2 discloses a hanging roaster combining a "drip" pan, two pan-supports for suspending the pan from a rack (typically the top rack) in an oven, and at lease two skewer-supports for supporting a food-carrying skewer spaced above the pan bottom and below the top rack of the oven. The pan-supports are pivotable to facilitate compact storage of the hanging roaster. This device has shortcomings in that the skewers are only compatible with a specific pan, and cannot be removed from the pan for cooling the turkey. This device may also be extremely difficult to clean due to the many interconnected parts described. It also cooks the poultry on a level surface, which does not allow for juices to be retained by the poultry.

U.S. Pat. No. 8,418,604B1 discloses a rack for positioning food slabs in a horizontal cooking area such as over a grill, including a rectangular frame which carries a plurality of bent rod food slab supports at a rearward tilt. The food slab rack has a plurality of interconnected pieces and hinges, meaning that cleaning may be difficult.

U.S. Pat. No. 9,155,423B2 discloses a roasting rack for cooking fowl comprising a horizontally disposed U shaped stand having integrally interconnected and spaced apart mutually parallel legs, a vertically disposed post detachably connected to the stand, said post having first and second vertically spaced apart branches projecting over the stand where the first and second branches are situated in a vertical plane that bisects the space between the legs of the stand, a handle pivotally attached to the first branch and a fowl supporting saddle attached to the second branch.

U.S. Pat. No. 9,782,037B2 discloses a device for roasting a food item includes a stand having a frame adapted to be positioned on a surface of a cooking device. The frame includes an upper frame member. A food hanger is adapted to support the food item and engages the upper frame member in a removable fashion so that a majority of the food item is suspended below the upper frame member and above the surface of the cooking device when the frame is positioned thereon. The device does not allow for hands-free cooking—the chicken generally needs to be handled when maneuvering it in and out of an oven.

USD260221 illustrates a design for a combined cooking, roasting, and shishkebob pan. The design has several intricately connected parts which does not allow for easy cleaning. Further shortcomings include difficult storage, as the device is not collapsible.

USD333235 illustrates a design for a roasting pan rack. Shortcomings of this design include difficult storage and difficult cleaning.

USD416169 illustrates a design for a wire roasting rack. Shortcomings of this design include difficult storage and difficult cleaning.

USD838548S1 illustrates a poultry rack. Shortcomings of this design include difficult storage and difficult cleaning.

All documents cited herein are incorporated by reference.

None of the above cited documents, alone or in combination satisfy the need for a compact, easily cleaned, evenly roasting meat and poultry support and roasting rack that addresses the above-mentioned deficiencies.

BRIEF SUMMARY

It is an object of the invention to provide a meat and poultry cooking and support device for cooking and supporting meat and poultry.

It is a further object of the invention to provide a method for cooking and supporting meat and poultry using a meat and poultry cooking and supporting device.

It may be a further object of the invention to provide device for cooking and supporting meat and poultry that may be compactly stored and easily cleaned when in a disassembled configuration.

It may be a further object of the invention to provide a method for cooking and supporting meat and poultry that is simple, minimizes handling of meat and poultry, and results in evenly roasted meat and poultry that may cook faster than meat and poultry in prior art cooking racks.

In accordance with an aspect of the invention there is provided a meat and poultry support rack for cooking and cooling meat and poultry, the meat and poultry support rack comprising a meat and poultry support element, a first stand element, and a second stand element. The meat and poultry support element comprises two or more interconnected and spaced apart support rod elements. The first stand element comprises first and second spaced parallel rods, said parallel rods joined by a first bottom horizontal support and by a first top horizontal support. The second stand element comprises third and fourth spaced parallel rods, said parallel rods joined by a second bottom horizontal support and by a second top horizontal support. The first and second top horizontal supports each comprising two or more openings sized and configured to accommodate said support rod elements. The first, second, third, and fourth spaced parallel rods each have a bent structure, comprising an upper end and a lower end spaced forwardly from said upper end. The third and fourth spaced parallel rods are substantially shorter than said first and second spaced parallel rods.

In accordance with another aspect of the invention there is provided a method for supporting and roasting one or more poultries using the meat and poultry support rack, the method comprising: sliding said meat and poultry support element through said meat and poultry and assembling said meat and poultry support rack into said assembled configuration.

The advantages and features of the present invention will become better understood with reference to the following more detailed description and claims taken in conjunction with the accompanying drawings in which like elements are identified with like symbols.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In the figures, embodiments are illustrated by way of example. It is to be expressly understood that the description and figures are only for the purpose of illustration and as an aid to understanding.

Figure 1:
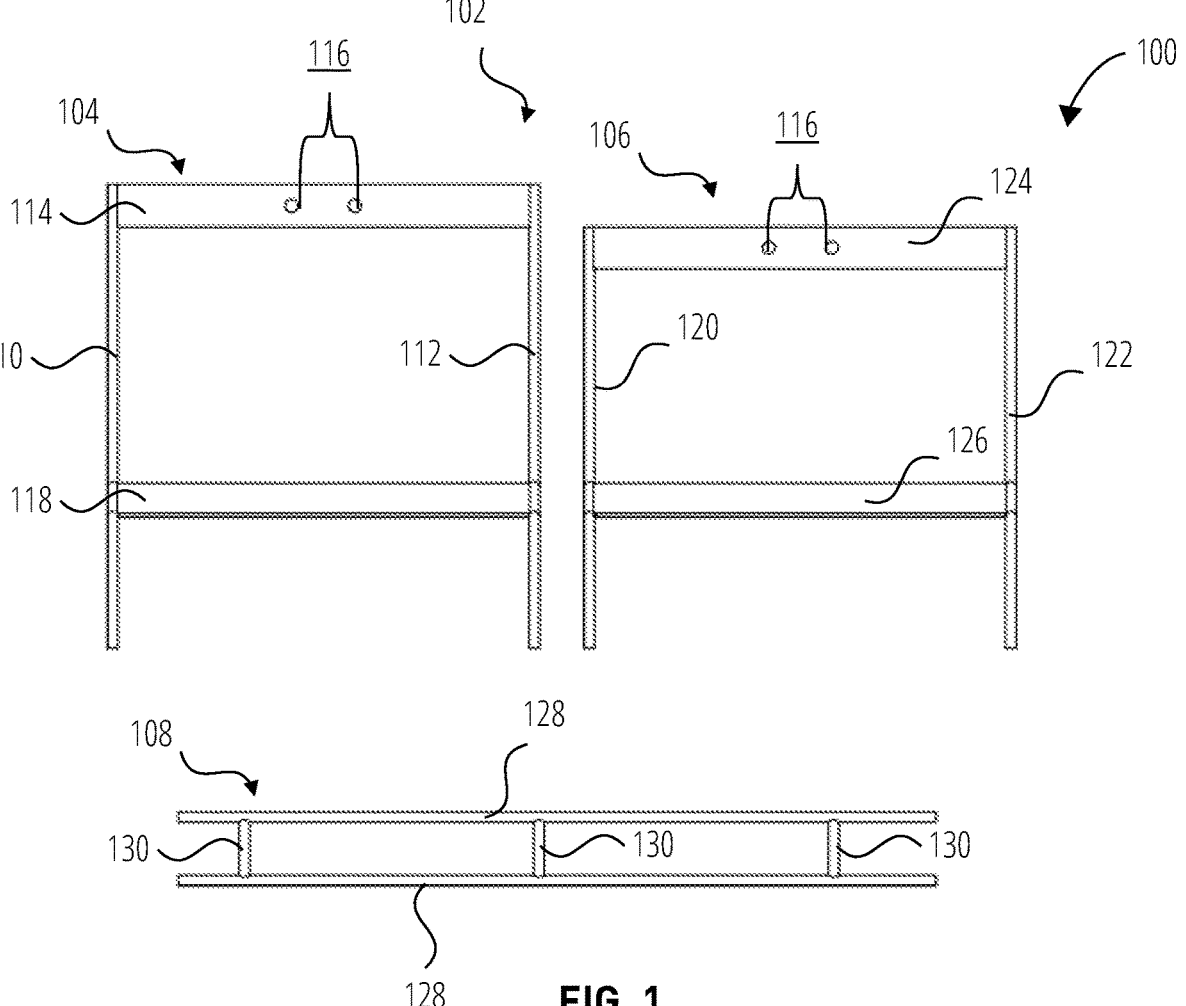

Embodiments will now be described, by way of example only, with reference to the attached figures, wherein the figures:

FIG. 1 illustrates a top aspect of a 2D view of the subject matter in accordance with one embodiment.

Figures 2A, 2B:
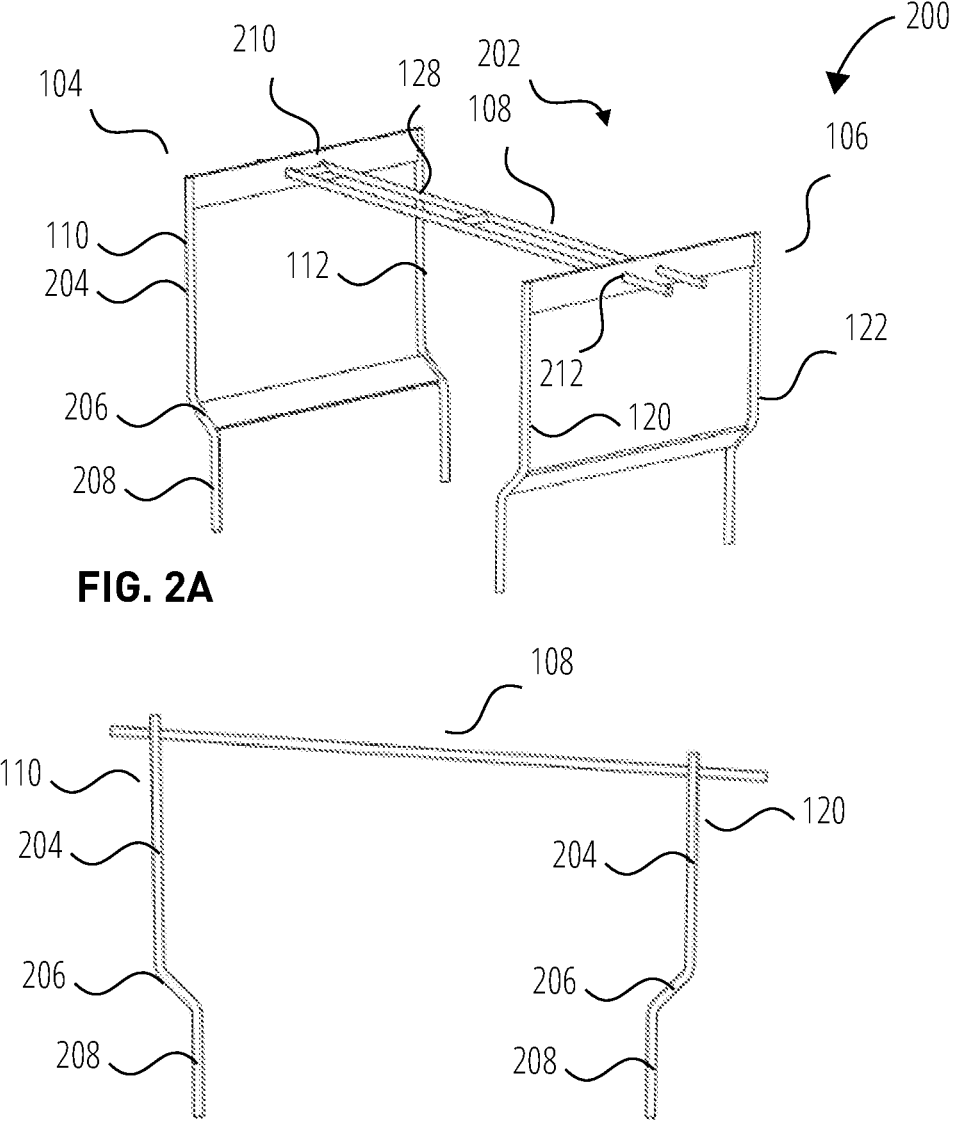

FIG. 2A illustrates a perspective view of the subject matter in accordance with one embodiment.

FIG. 2B illustrates an aspect of the subject matter in accordance with one embodiment.

Figure 3:
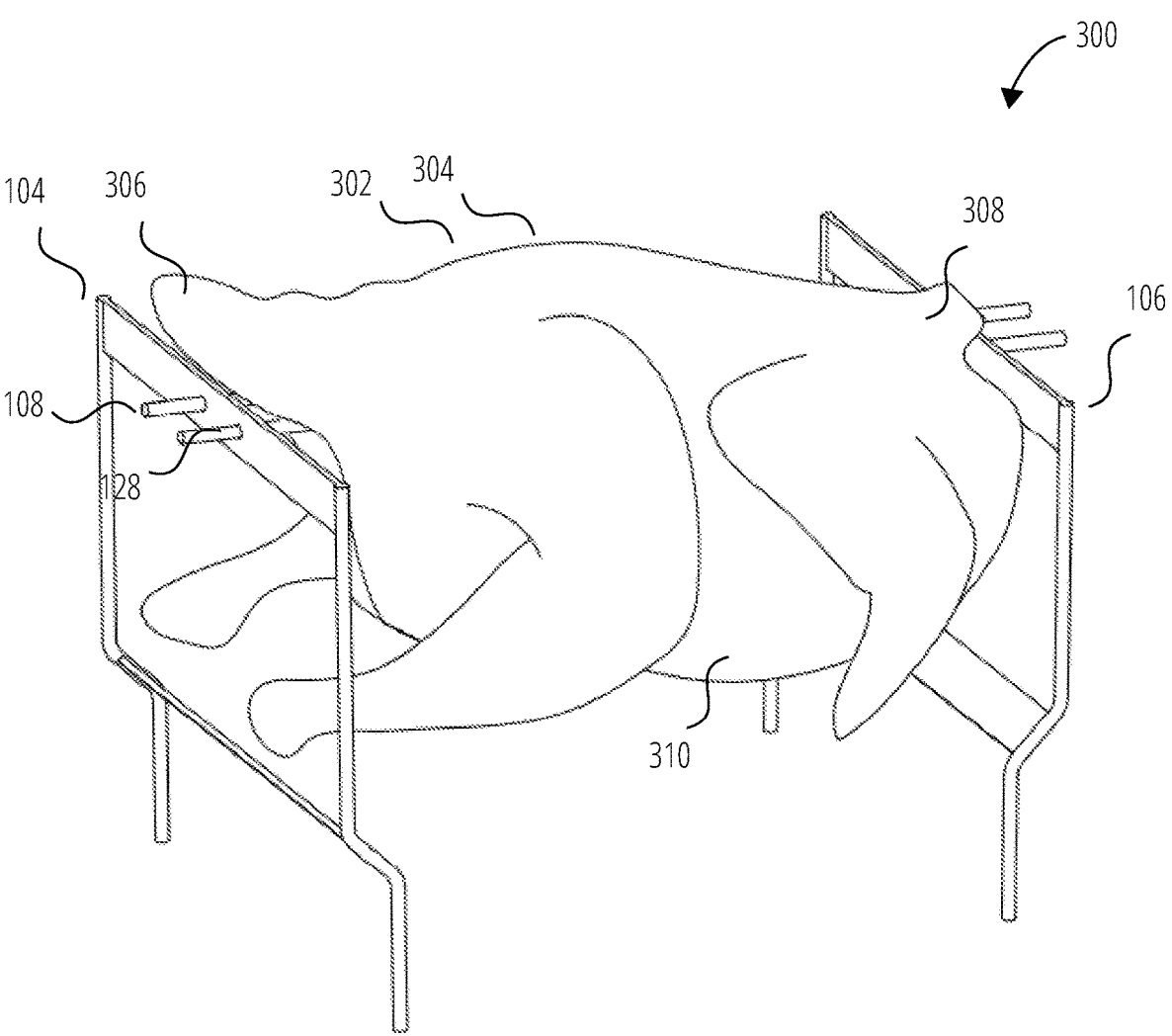

FIG. 3 illustrates an aspect of the subject matter in accordance with one embodiment.

Figure 4A:
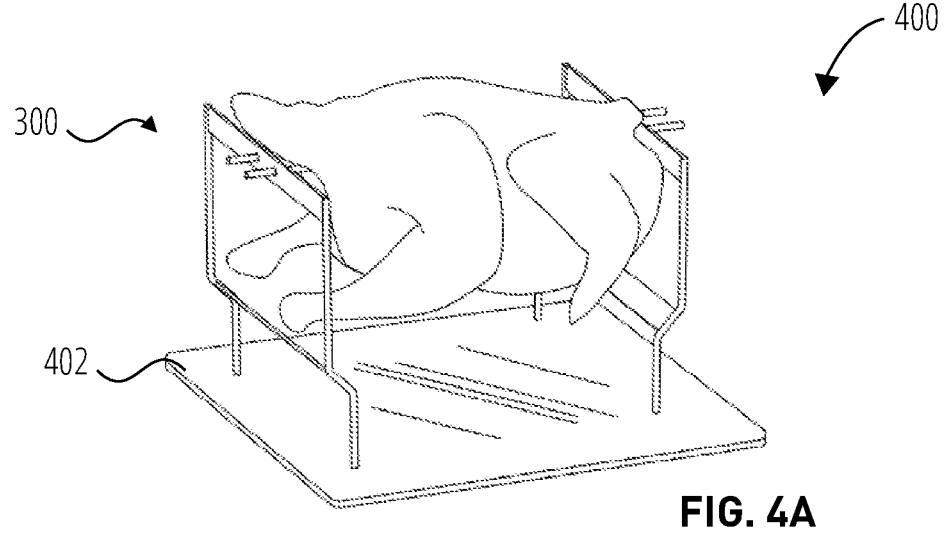

FIG. 4A illustrates an aspect of the subject matter in accordance with one embodiment.

Figure 4B:
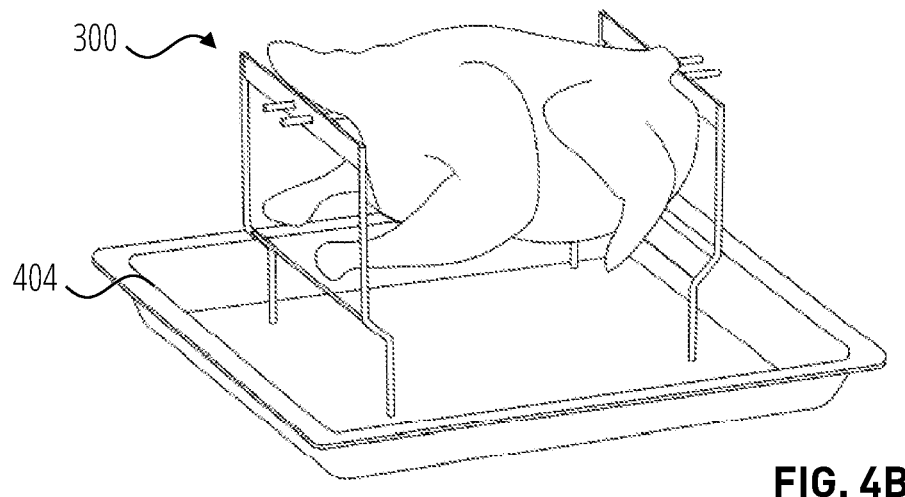

FIG. 4B illustrates an aspect of the subject matter in accordance with one embodiment.

Figures 5A, 5B:
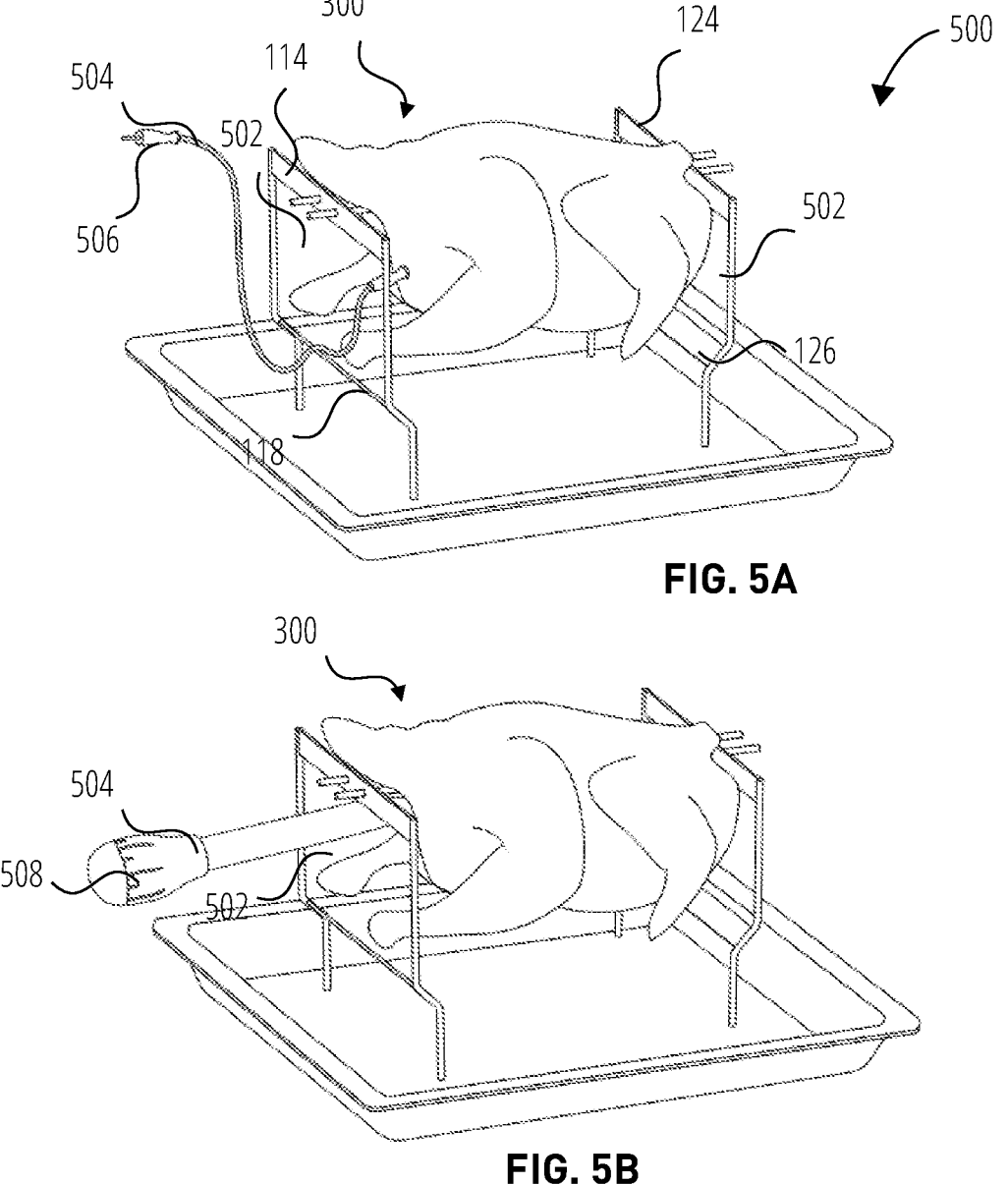

FIG. 5A illustrates an aspect of the subject matter in accordance with one embodiment.

FIG. 5B illustrates an aspect of the subject matter in accordance with one embodiment.

DETAILED DESCRIPTION

The term "connected", "attached", "affixed" or "coupled to" may include both direct coupling (in which two elements that are coupled to each other contact each other) and indirect coupling (in which at least one additional element is located between the two elements).

The term "meat" preferably includes, but is not limited to, beef, poultry, fish, pork, lamb, and the like.

Devices and methods for carrying out the invention are presented in terms of embodiments depicted within the FIGS. However, the invention is not limited to the described embodiments, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and the configurations shall be shown and described for purposes of clarity and disclosure and not by way of limitation of scope.

The features of the invention which are believed to be novel are particularly pointed out in the specification. The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

FIG. 1 shows a meat and poultry support rack 100 in a disassembled configuration 102.

The meat and poultry support rack 100 preferably comprises a first stand element 104, a second stand element 106, and a meat and poultry support element 108. In the meat and poultry support rack disassembled configuration 102, these are three separate pieces.

The meat and poultry support element 108 preferably comprises two or more interconnected and spaced apart support rod elements 128. The support rod elements 128 can be seen as being connected by connection members 130.

The first stand element 104 preferably comprises first and second spaced parallel rods 110, 112, joined by a first bottom horizontal support 118 and by a first top horizontal support 114.

The second stand element 106 preferably comprises third and fourth spaced parallel rods 120, 122, joined by a second bottom horizontal support 126 and by a second top horizontal support 124.

It can be seen that the first and second top horizontal supports 114, 124, each comprise two or more openings 116 sized and configured to accommodate the support rod element 128.

In the disassembled configuration 102 the first stand element 104, second first stand element 104, and meat and poultry support element 108 may stack on top of one another for compact storage.

The disassembled configuration 102 preferably enables easy storage and cleaning.

FIG. 2A shows a 3-dimensional perspective view of a meat and poultry support rack 200 in an assembled configuration 202.

FIG. 2B shows a 2-dimensional side view of a meat and poultry support rack 200 in an assembled configuration 202.

In the meat and poultry support rack assembled configuration 202, The meat and poultry support rack 200 stands by releasably connecting the first stand element 104 and the second stand element 106 to opposing ends 210, 212 of the meat and poultry support element 108.

The first end 210 of the meat and poultry support element 108 releasably intersects with said two or more openings 116 (not visible from this view) of one of the first or second stand elements 104, 106. A second end 212 releasably intersects with two or more openings 116 (not visible from this view) of the other of the first or second stand elements. This intersection occurs on both the first and second ends 210, 212, by sliding the support rod elements 128 through the openings 116.

It can be best appreciated from this view that said first and second, third, and fourth spaced parallel rods 110, 112, 120, 122, each have a bent structure 206, comprising an upper end 204 and a lower end 208, which is preferably spaced forwardly from said upper end.

Preferably, in the assembled configuration 202, the lower ends 208 are oriented towards one another, such that the bent structure 206 of the first stand element 104 faces the bent structure 206 of the second stand element 106.

This allows the meat and poultry support rack 200 to stand on its own, without meat or poultry as shown here, or with meat or poultry, as shown in FIGS. 3-5, wherein the meat and poultry support rack 200 can be seen supporting poultry 304.

The meat and poultry support rack 200 may preferably stand on generic and commonly used surfaces, including but not limited to, hard surfaces or baking pans (shown in FIG. 4A and FIG. 4B).

Preferably, the bent structure 206 provides a strong, stable construction for the meat and poultry support rack 200.

Preferably, the third and fourth spaced parallel rods 120, 122, are substantially shorter than said first and second spaced parallel rods 110, 112. Therefore, when assembled in the assembled configuration 202, the meat and poultry support element 108 is on an angle.

For example, in an embodiment, the third and fourth spaced parallel rods 120, 122, are on the order of 1-5 inches shorter than the first and second spaced parallel rods.

For example, but not by way of limitation, in one embodiment the total height of the first stand element 104 is 11 inches, while the total height of the second stand element 106 is 10 inches.

Preferably, due to the difference in height between the taller first and second spaced parallel rods 110, 112, and the shorter third and fourth spaced parallel rods 120, 122, the meat and poultry support element 108 is angled downwards with respect to the first stand element 104, with its highest end being that end that intersects with the openings 116 of the first stand element 104.

FIG. 3 shows an embodiment of a meat support rack with poultry 300, which may be used for cooking, roasting, or supporting poultry 304.

A simple and easy to use method for supporting and cooking one or more bodies of meat 302, including, by way of example, poultry 304 using the meat and poultry support rack 200 preferably comprises: sliding the meat and poultry support element 108 through one or more pieces of poultry 304. Then the meat and poultry support rack 200 is assembled into the meat and poultry support rack assembled configuration 202. It can be seen that the poultry 304 is therefore suspended in the air by the support rod element 128.

The poultry 304 is preferably positioned such that the bottom end 306 is facing said first stand element 104 and a neck end 308 of said poultry is facing said second stand element 106, such that the bottom end 306 of the poultry 304 is suspended higher than the neck end 308. This allows any juices and seasoning to be retained inside the poultry without draining out.

Poultry 304 may comprise chicken, turkey, and other types of poultry 304.

Certain embodiments may hold more than one chicken, turkey, or other kind of poultry 304 or meat 302.

It should be understood that this method could be readily applied to roasting other kinds of meat 302, including beef, fish, pork, and the like. It can be applied, for example, to preparing roast beef.

Preferably, for cooking poultry 304, the poultry 304 is positioned with the breast 310 facing down.

Different sizes and dimensions may be employed in manufacturing the meat and poultry support rack 100 in order to accommodate different sizes of meat 302.

The first and second stand elements 104, 106, may slide along the meat and poultry support element 108 to increase or decrease the available length of the support rod elements 128 that are available to hold the poultry 304 or meat 302.

FIG. 4A and FIG. 4B show various uses of a meat and poultry support rack 400.

FIG. 4A shows a three-dimensional perspective view of a meat support rack with poultry 300 positioned on a hard surface 402.

The hard surface 402 may comprise a cutting board, counter top, stovetop, and the like.

Once suspended on the meat and poultry support rack 200, the poultry 304 need not be touched or handled until it is time to eat it.

FIG. 4B shows a three-dimensional perspective view of a meat support rack with poultry 300 positioned in a baking pan 404.

The meat and poultry support rack 200 preferably fits in most commercial baking pans.

In the example, it can be seen that meat 302, shown here as poultry 304 may be cooked or roasted in an oven, by positioning the meat support rack with poultry 300 in a baking pan 404 and then placing the baking pan 404 in an oven.

The suspended poultry 304 cooks faster and more evenly than poultry that may be cooked while touching a baking pan 404. Heat from the oven is preferably allowed to go around the whole poultry 304 due to its suspension in air.

Since the poultry 304 is suspended on an angle, juices and seasonings are preferably retained inside the poultry 304.

The meat support rack with poultry 300 may be lifted in and out of the baking pan 404 without touching or handling the poultry 304. Therefore the poultry may be cooked, seasoned, basted, cooled and rested on the hard surface 402 or in the baking pan 404.

FIG. 5A and FIG. 5B show three-dimensional perspective views of a meat and poultry support rack for use with accessories 500.

It can be seen that the first and second stand elements 104, 106 each comprise open areas 502, which are located, for the first stand element 104, between the first top horizontal support 114 and the first bottom horizontal support 118, and for the second stand element 106, between the second top horizontal support 124 and the second bottom horizontal support 126.

Accessories 504 may be positioned in the meat 302 or poultry 304 by inserting them in the open areas 502.

Accessories 504 may comprise various items, for example, but not limited to a thermometer 506 (FIG. 5A) or a baster 508 (FIG. 5B).

The meat and poultry support rack 200 comprises three separate pieces: the first stand element 104, the second stand element 106, and the meat and poultry support element 108. The pieces may be formed from a heat resistant and durable material.

The preferred embodiment comprises heat resistant and durable material in the form of stainless steel or steel. Alternative embodiments may comprise cast iron, iron, or materials of similar heat resistance and durability.

These pieces may provided individually or as parts, in a kit for cooking and supporting meat and poultry and poultry.

In the preferred embodiment, the pieces may be formed as separate but unitary structures for example, but not limited to, by welding metal together to form the pieces, or cutting the shapes of the pieces out from sheets of material.

In an alternate embodiment, the pieces may be formed from separate elements bolted together.

Various sizes, lengths, and widths of the pieces may be constructed in order to accommodate different types of meat and poultry, and/or in order to accommodate more than one piece of meat. For example, one embodiment may be of a length to accommodate one chicken, and another embodiment may be of a length to accommodate two chickens, another embodiment may be of a length to accommodate a roast, and yet another embodiment may be of a length to accommodate a turkey. The length of the meat and poultry support rack 100 may preferably be adjusted by sliding the stand elements 104, 106, along the meat and poultry support element 108 to increase or decrease the available length of the support rod elements 128 that are available to hold the poultry 304 or meat 302.

The terms "cooking" and "roasting" may be used interchangeably herein.

The term "connected", "attached", "affixed" or "coupled to" may include both direct coupling (in which two elements that are coupled to each other contact each other) and indirect coupling (in which at least one additional element is located between the two elements).

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The foregoing descriptions of specific embodiments of the present invention have been presented for purposes of illustration and description. They are not intended to be exhaustive or to limit the invention and method of use to the precise forms disclosed. Many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

The invention claimed is:

1. A meat and poultry support rack for cooking and cooling meat or poultry, the meat and poultry support rack comprising:

a meat and poultry support element, a first stand element, and a second stand element;

said first stand element comprising first and second spaced parallel rods, said first and second parallel rods are joined by a first bottom horizontal support and by a first top horizontal support;

said second stand element comprising third and fourth spaced parallel rods, said third and fourth parallel rods are joined by a second bottom horizontal support and by a second top horizontal support;

said first and second top horizontal supports each configured to receive said meat and poultry support element;

said first, second, third, and fourth spaced parallel rods each having a bent structure, comprising an upper end and a lower end spaced inwardly from said upper end; and said third and fourth spaced parallel rods being substantially shorter than said first and second spaced parallel rods.

2. The meat and poultry support rack of claim 1, wherein said first stand element comprises an open area between said first bottom horizontal support and said first top horizontal support, and said second stand element comprises an open area between said second bottom horizontal support and said second top horizontal support.

3. The meat and poultry support rack of claim 1, wherein said first and second stand elements, and said meat and poultry support element, are formed from a heat resistant and durable material.

4. The meat and poultry support rack of claim 2, wherein the heat resistant and durable material comprises stainless steel, steel, cast iron, iron, or materials of similar heat resistance and durability.

5. The meat and poultry support rack of claim 1 having an assembled configuration and a disassembled configuration.

6. The meat and poultry support rack of claim 5, in which said meat and poultry support element comprises two or more interconnected and spaced apart support rod elements, and the first and second top horizontal supports each comprise two or more openings sized and configured to receive said spaced apart support rod elements, the meat and poultry support rack having said assembled configuration, wherein a first end of said support rod elements releasably intersects with said two or more openings of one of the first or second stand elements, and a second end releasably intersects with said two or more openings of the other of the first or second stand elements.

7. The meat and poultry support rack of claim 5, having said assembled configuration, wherein the first and second stand elements have a generally vertical orientation, and the meat and poultry support element has a generally horizontal and raised orientation.

8. The meat and poultry support rack of claim 5, having said assembled configuration, wherein said lower end of said first and second spaced parallel rods is oriented towards said lower end of said third and fourth spaced parallel rods.

9. The meat and poultry support rack of claim 5, having said disassembled configuration, wherein the first and second stand elements and the meat and poultry support element are three separate pieces.

10. The meat and poultry support rack of claim 9, wherein the three separate pieces stack on top of one another for compact storage.

11. A method for supporting and cooking meat or poultry-using the meat and poultry support rack of claim 1, the method comprising:

providing the meat and poultry support rack of claim 1;

sliding said meat and poultry support element of the meat and poultry support rack through said meat or poultry, assembling said meat and poultry support rack into an assembled configuration such that the meat and poultry support element is inserted through openings of said first and second top horizontal supports respectively, so that the meat or poultry is suspended on the meat and poultry support element of the meat and poultry support rack.

12. The method of claim 11, wherein assembling said meat and poultry support rack into said assembled configuration further comprises facing said lower end of said first and second spaced parallel rods towards said lower end of said third and fourth spaced parallel rods.

13. The method of claim 12, wherein assembling said meat and poultry support rack into said assembled configuration further comprises orienting said meat and poultry support rack such that a bottom end of said meat or poultry is facing said first stand element and a neck end of said meat is facing second stand element such that said bottom end is suspended higher than said neck end.

14. The method of claim 13, wherein said meat and poultry support rack is positioned in a baking pan.

15. The method of claim 13, wherein said meat and poultry support rack is positioned on a hard surface, such as a countertop, stovetop, a cutting board, and the like.

16. The method of claim 13, wherein an accessory may be placed into said bottom end of said meat and poultry, said accessory entering through said first open area.

17. The method of claim 16, wherein the accessory comprises a baster, a thermometer, and the like.

18. A kit for cooking and supporting meat and poultry, the kit comprising:

a meat and poultry support rack having a meat and poultry support element, a first stand element, and a second stand element;

said meat and poultry support element comprising two or more interconnected and spaced apart support rod elements;

said first stand element comprising first and second spaced parallel rods, said first and second parallel rods are joined by a first bottom horizontal support and by a first top horizontal support;

said second stand element comprising third and fourth spaced parallel rods, said third and fourth parallel rods are joined by a second bottom horizontal support and by a second top horizontal support;

said first and second top horizontal supports each comprising two or more openings sized and configured to receive said support rod elements therein;

said first, second, third, and fourth spaced parallel rods each having a bent structure comprising an upper end and a lower end spaced inwardly from said upper end; and said third and fourth spaced parallel rods being substantially shorter than said first and second spaced parallel rods.

* * * * *